(12) United States Patent
Katzer

(10) Patent No.: US 7,966,387 B1
(45) Date of Patent: *Jun. 21, 2011

(54) SYSTEM AND METHOD FOR PROVISIONING PERSONALIZED DATA INTO MOBILE DEVICE

(75) Inventor: Robin Dale Katzer, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 12/778,720

(22) Filed: May 12, 2010

Related U.S. Application Data

(62) Division of application No. 11/948,685, filed on Nov. 30, 2007, now Pat. No. 7,752,292.

(51) Int. Cl.
*G06F 15/177* (2006.01)
(52) U.S. Cl. ........................ 709/222; 455/419
(58) Field of Classification Search .......... 709/220–223; 707/10; 455/419
See application file for complete search history.

(56) References Cited

U.S. PATENT DOCUMENTS

| 7,200,390 B1 | 4/2007 | Henager et al. |
| 2004/0054750 A1 | 3/2004 | de Jong et al. |
| 2006/0106920 A1 | 5/2006 | Steeb et al. |
| 2008/0162497 A1 | 7/2008 | Lim |
| 2008/0214173 A1* | 9/2008 | Preiss et al. .................... 455/419 |

OTHER PUBLICATIONS

Katzer, Robin D., "System and Method for Provisioning Personalized Data Into Mobile Device," U.S. Appl. No. 11/948,685, filed Nov. 30, 2007.
Notice of Allowance dated Mar. 5, 2010, 13 pages, U.S. Appl. No. 11.948,685, filed Nov. 30, 2007.

* cited by examiner

*Primary Examiner* — Salad Abdullahi

(57) ABSTRACT

The present disclosure provides a system that comprises a proxy server configured to receive a first service request message, to keep a message count based on an Internet protocol (IP) address, to drop the first service request message if the message count reaches a threshold, to build one or more executable, complex objects using more than one data items from the first service request message and an object definition schema, and to produce a second service request message by executing the one or more executable, complex objects. The system also provides a mobile device that includes an application manager, wherein the proxy server is configured to send the second service request message to a designated port on the mobile device, wherein the application manager is configured to listen on the designated port and in response to receiving the second service request message on the designated port, to wake up a provisioning application associated with the designated port, and wherein the provisioning application is configured to initiate provisioning one or more personalized data items into the mobile device.

19 Claims, 6 Drawing Sheets

SYSTEM AND METHOD FOR PROVISIONING PERSONALIZED DATA INTO MOBILE DEVICE

CROSS-REFERENCE TO RELATED APPLICATIONS

This application is a divisional of, and claims priority to, U.S. patent application Ser. No. 11/948,685, entitled System and Method for Provisioning Personalized Data into Mobile Device, by inventor Robin D. Katzer, filed on Nov. 30, 2007, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile device such as a mobile phone is a personalized device that may have a unique mobile directory number (MDN), a unique mobile identification number (MIN), and other individualized data items. To take advantage of this personalized device, institutions or entities such as banks and advertisement agencies may collaborate with a mobile network carrier to provision personalized data into the mobile device so that the mobile device may function as a credit card, a coupon book, or an identification (ID) card, among other roles, to provide more conveniences to customers. A service request message may be sent to the mobile device to initiate the provisioning of the personalized data items. Different network technologies and messaging protocols may be used to send the service request message. For example, a bank may use the hypertext transfer protocol (HTTP) to initiate a credit card provisioning request to the mobile device, and an advertisement agency may use the email message to push an advertisement onto the mobile device.

SUMMARY

In one embodiment, a system is provided that comprises a proxy server configured to receive a first service request message, to keep a message count based on an Internet protocol (IP) address, to drop the first service request message if the message count reaches a threshold, to build one or more executable, complex objects using more than one data items from the first service request message and an object definition schema, and to produce a second service request message by executing the one or more executable, complex objects. The system also provides a mobile device that includes an application manager, wherein the proxy server is configured to send the second service request message to a designated port on the mobile device, wherein the application manager is configured to listen on the designated port and in response to receiving the second service request message on the designated port to wake up a provisioning application associated with the designated port, and wherein the provisioning application is configured to initiate provisioning one or more personalized data items into the mobile device.

In one embodiment, a method for provisioning personal data into a mobile device is provided that includes initiating an extensible markup language (XML)-based first service request message using an HTTP message protocol, limiting the first service request message, building one or more complex JAVA objects using more than one data item from the first service request message and a JAVA object definition schema, producing a short message service (SMS) message by executing the one or more complex JAVA objects, and waking up a provisioning application on a mobile device to initiate provisioning of a plurality of personalized data items into a mobile device by sending the SMS message to a designated port on the mobile device.

In another embodiment, a short message peer-to-peer protocol (SMPP) proxy server is provided that includes an application program interface (API) configured to receive an XML-based service request message containing more than one data items destined for a mobile device using a hypertext transfer protocol (HTTP) and an object generator configured to produce one or more complex JAVA objects from a JAVA object definition schema and the more than one data items from the XML-based service request message. The SMPP proxy server also includes a protocol service module configured to execute the one or more complex JAVA objects to produce a short message service (SMS) service request message and an SMPP interface module configured to send the SMS service request message to an application manager on a mobile device to wake up a provisioning application to initiate provisioning of a plurality of personalized data items into the mobile device These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Different network technologies and messaging protocols may be used by different entities to send service request messages to initiate provisioning of personalized data into a mobile device. For example, a bank may use the hypertext transfer protocol (HTTP) to initiate a credit card provisioning request to the mobile device, and an advertisement agency may use an email protocol to push an advertisement onto the mobile device.

The present disclosure provides a means to throttle or limit the messages to be sent to a mobile device to reduce the chance that the mobile device is inundated with messages, and to alleviate the message processing load on a server. The present disclosure also provides a generic approach to generating a message such as a short message service (SMS) message suitable to be sent to the mobile device by building a complex, executable object from a received service request message and an object definition schema. This approach may avoid the need to hardcode a solution for a service request message, either on the mobile device or on server communicating with the mobile device. The present disclosure also uses a short message peer-to-peer protocol (SMPP) to send the SMS message to a designated port on the mobile device to wake up a provisioning application to start the provisioning of the personalized data into the mobile device.

Figure 1:
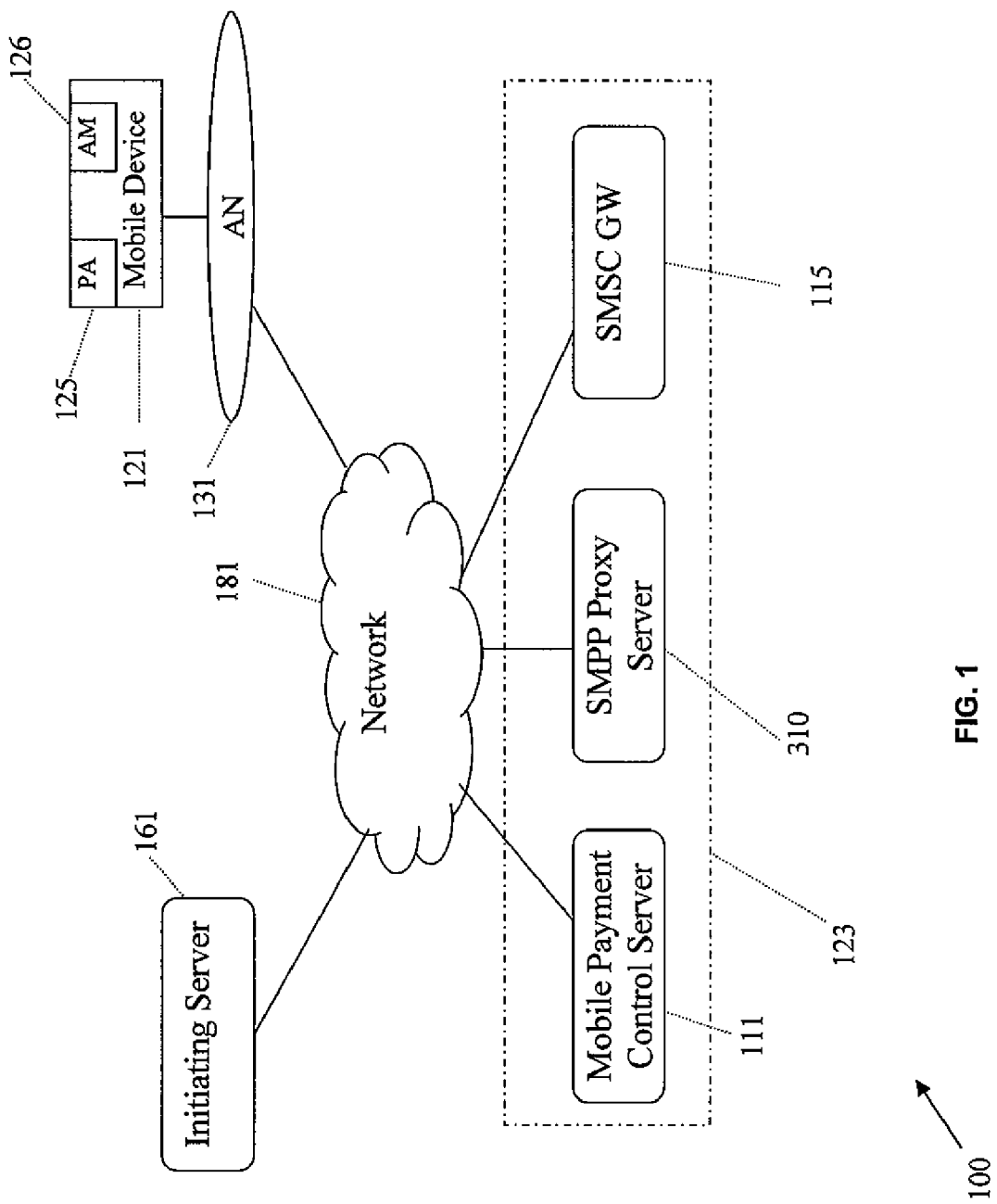
FIG. 1 illustrates an embodiment of a network.

FIG. 1 illustrates an embodiment of a network 100 for provisioning personalized data items into a mobile device. The network 100 comprises an initiating server 161, an interconnecting network 181, an application server domain 123, a wireless access network (AN) 131, and a mobile device 121. Portions of the network 100, such as the initiating server 161, may be embodied as a general purpose computer. General purpose computer systems are described in greater detail hereinafter.

The initiating server 161 is a network node that may be part of an entity that is different from the one to which the application server domain 123 belongs. For example, the initiating server 161 may be part of a banking network or other commercial network; the application server domain 123 may belong to a wireless network carrier. The initialing server 161 may be configured to initiate a service request message for provisioning personal data items into the mobile device 121. The application server domain 123 may need to convert the service request message to a second message suitable for the mobile device. The initiating server 161 may use the HTTP to send the service request message to the application server domain 123. The application server domain 123 may use an SMPP to send the second message to the mobile device 121. In addition, the initiating server 161 may use a network technology that is different from the one that the application server domain 123 uses. For example, the initiating server 161 may use an asynchronous transfer mode (ATM) network technology, and the application server domain 123 may use an IP network technology.

The interconnecting network 181 may connect the application server domain 123 with the initiating server 161, and may interconnect a set of application servers within the application server domain 123. The interconnecting network 181 may comprise a single network, or multiple networks, including the Internet, depending on the network configuration. The interconnecting network 181 may use Internet Protocol (IP), asynchronous transfer mode (ATM), time division multiplexing (TDM), other networking technologies, or a combination of the above.

The application server domain 123 may include a number of application servers to accommodate different types of application needs. The application server domain 123 may include a mobile payment control server 111, an SMPP proxy server 310, and an SMSC gateway 115. Other servers may include a banking service server, a security server, and a billing server, among others. The application servers within the application server domain 123 may communicate with each other via the interconnecting network 181 or an internal network (not shown). The mobile payment control server 111, the SMPP proxy server 310, and the SMSC gateway 115 may be closely coupled with each other at one location or distributed across the network 100, depending on the system configuration and the design choice. The mobile payment control server 111, the SMPP proxy server 310, and the SMSC gateway 115 may be embodied on a general purpose computer, as described in more detail hereinafter.

The mobile payment control server 111 may be a gateway node of the application server domain 123. A gateway node may normally perform functions such as protocol translation and message format conversion, among others. Messages from an outside network node such as the initiating server 161 may first come to the mobile payment control server 111. The mobile payment control server 111 may be configured to perform mobile payment related operations such as network protocol conversion, message protocol conversion, and security checking, among others. For example, a banking network node may send a service request message in the ATM cell format using the HTTP protocol. The mobile payment control server 111 may translate the ATM cells to IP packets, and perform security checks on the IP packets before forwarding the IP packets to the SMPP proxy server 310.

Figure 3:
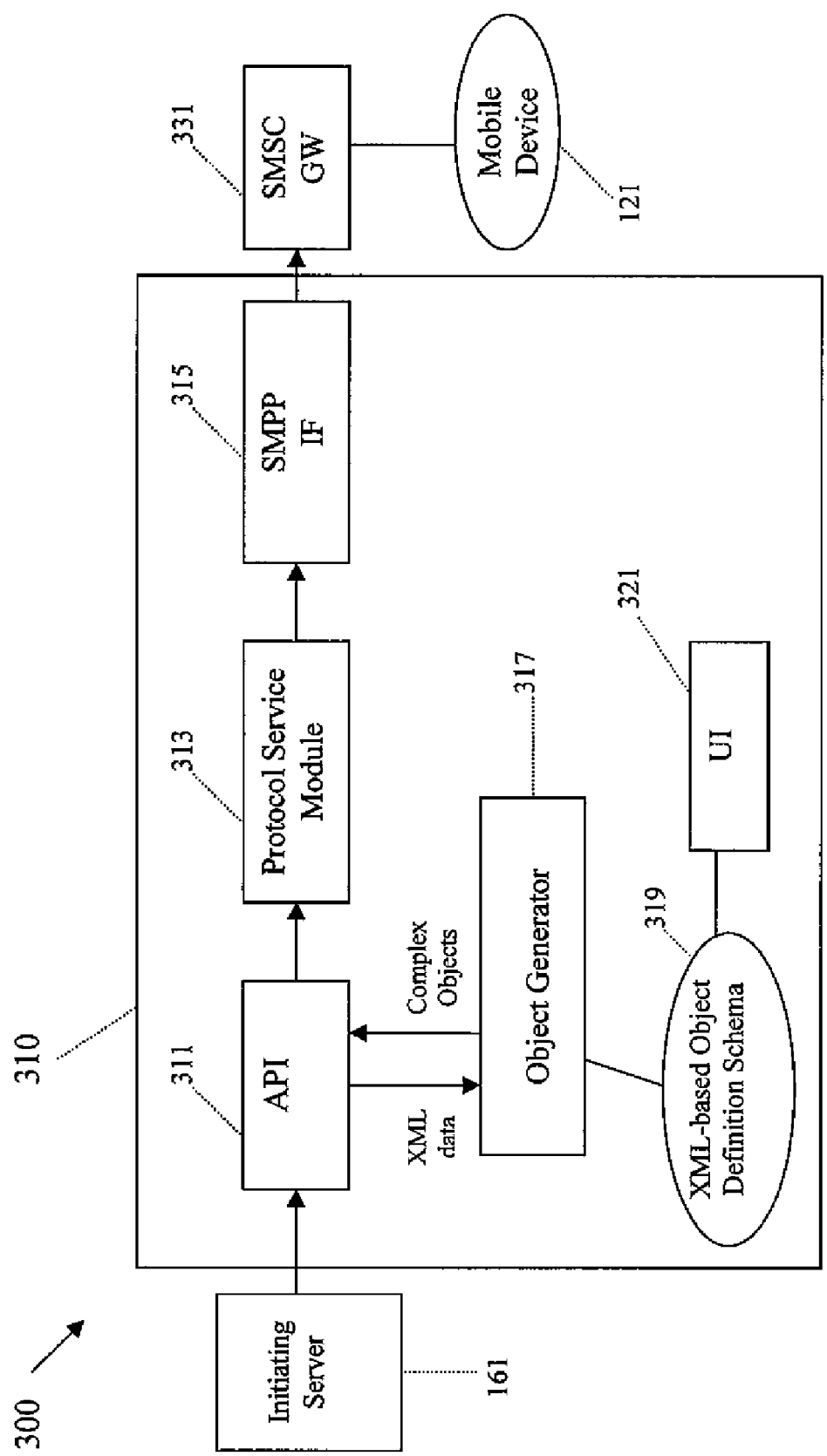
FIG. 3 illustrates an embodiment of a protocol proxy server.

The SMPP proxy server 310 may serve SMPP related requests from a client node such as the initiating server 161 on behalf of a SMPP server (not shown) that may be located outside the network 100 and belong to a different network carrier. The services the SMPP proxy server 310 may provide include converting a received service request message to an SMS message suitable to be sent to the mobile device 121. Details of the SMPP proxy server 310 are illustrated in FIG. 3 and described later.

The short message service center (SMSC) gateway 115 is a gateway node that may route messages to destination devices. In one embodiment, the SMPP is the choice of the messaging protocol for sending the service request message to the mobile device 121. The SMSC gateway 115 may convert a received service request message in a format other than the SMS into an SMS message, communicate with an SMSC to get routing information, and then route the SMS message to the mobile device 121.

The mobile device 121 may be used by a user to send a message or receive and view a message. In an embodiment, the mobile device 121 may be a mobile phone, a wireless personal digital assistant (PDA), a tablet computer, a laptop computer, and so on. The mobile device 121 may support one or more types of messages, depending on the hardware and software the mobile device 121 may support. The mobile device 121 may include a provisioning application (PA) 125 to help provision the personalized data items into the mobile device 121. The provisioning application 125 may store the personalized data items into appropriate data structures and locations on the mobile device 121 and report back to the initiating server 161 the status of the provisioning operation. The mobile device 121 may also include an application manager (AM) 126 that is configured to monitor a number of designated ports on the mobile device 121 and wake up an associated application once a message is received at a port. For example, the application manager 126 may listen to the port 8990 and wake up the provisioning application 125 that is associated with the port 8990 once an SMS service request message is sent to the port 8990, using the SMPP.

The wireless access network (AN) 131 may connect the mobile device 121 to the SMSC gateway 115 via the interconnecting network 181 and may comprise multiple network nodes. For example, in some of the second generation (2G) or some of the third generation (3G) wireless network configurations, the wireless access network 131 may comprise a number of base station transceivers (BTSs) and a base station controller (BSC). A BTS may comprise an antenna tower to receive radio signals from those mobile devices within its transmission range, for example the mobile device 121. Multiple BTSs may be coupled to a BSC via physical wires such as copper or fiber wires. Multiple BSCs and BTSs may form an AN to be coupled to an interconnecting network such as the network 181. More detail about mobile devices is provided with regard to FIG. 4.

Figure 2:
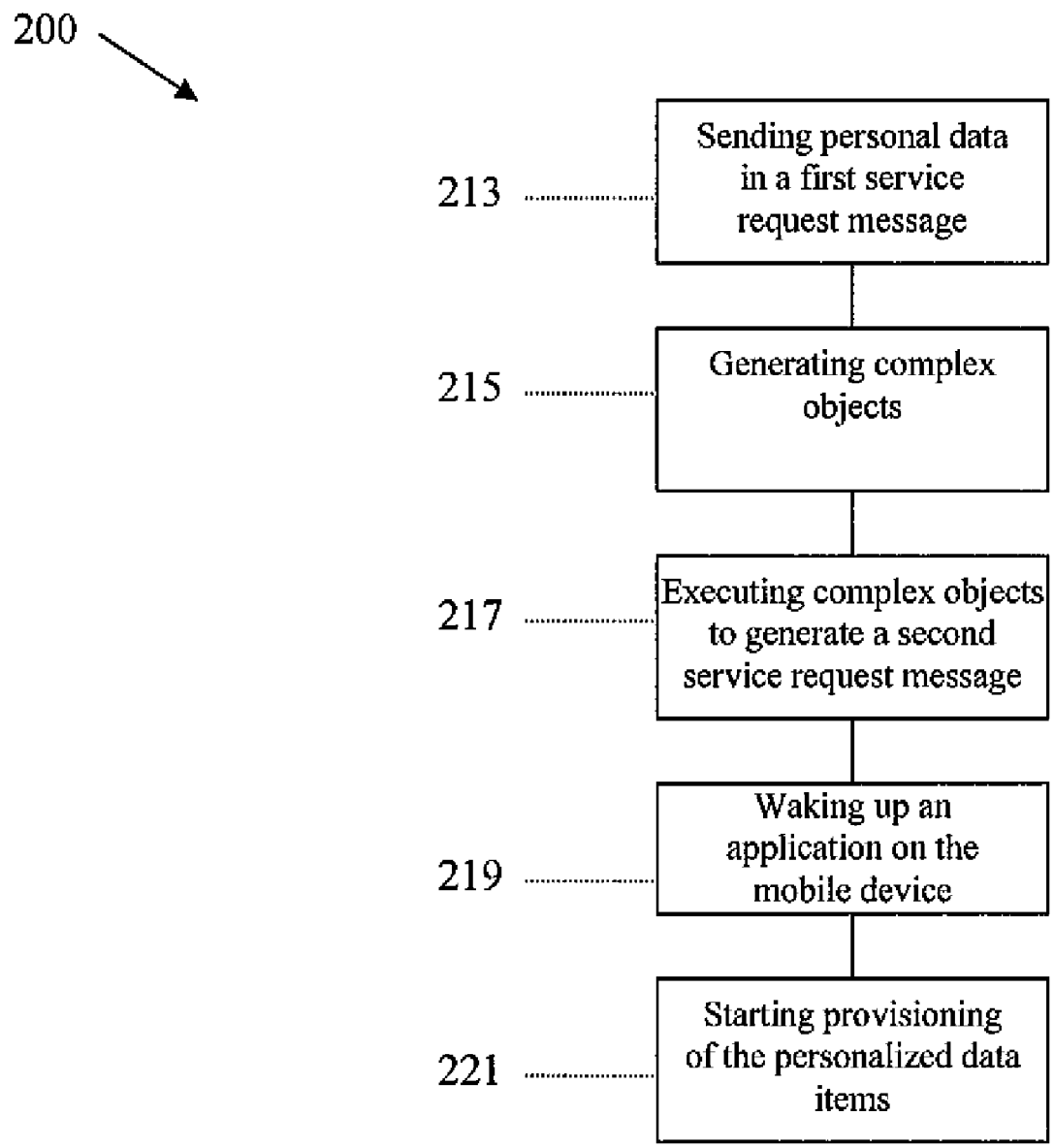
FIG. 2 illustrates an embodiment of a method for provisioning personalized data into a mobile device.

FIG. 2 illustrates an embodiment of a method 200 for converting a service request message to an SMS message to be sent to the mobile device 121 to initiate the provisioning of the personalized data items into the mobile device 121. The method 200 may include initiating a service request message at block 213, converting static data items into one or more complex objects at block 215, generating a second service request message by executing the generated complex object at block 217, waking up an application on a mobile device by sending the second service request message to the mobile device 121 at block 219, and initiating the provisioning of the personalized data items at block 221.

Block 213 shows initiating a service request message that is to be sent to the mobile device 121. The service request message may come from a network node such as the initiating server 161 that is outside the application server domain 123. The network node that initiates the service request message may not have any knowledge about the network protocol and message format suitable for sending the service request message to the mobile device 121. Thus, the message format of the service request message and the network protocol used to send the service request message may be different from the message format and the protocol to be used to send the service request message to the receiving mobile device 121. For example, in one embodiment, the service request message may be in an XML-based format, and may be sent to the application server domain 123 using an HTTP protocol over an IP network.

Block 215 shows generating one or more complex objects using more than one XML data items contained in the received service request message and an object definition schema. In one embodiment, JAVA is the choice of the programming language for implementing portions of the present disclosure, for example the SMPP proxy server 310. A JAVA complex object has a hierarchical structure with a parent object having one or more child objects or sub-objects. Producing one or more complex JAVA objects may involve parsing the service request message and the object definition schema, mapping the data items into the predefined class schema contained in the object definition schema file, and then generating a complex object from the data-filled class schema. In one embodiment, the document object model (DOM) parser is used to parse the object definition schema, and the simple API for XML (SAX) parser is used to parse the XML-based data items contained in the service request message. Then the object definition schema, which is held in storage space by the DOM parser, is used to map the data items into a hierarchical structure of the parsed object definition schema. For example, the service request message may have a subscriber ID, one or more MDNs that belong to the subscriber and uniquely identifies a mobile device, and a port on the mobile device to which the service request message is directed. A three-level containment relationship, or three-level place holders, from the subscriber ID to the MDN, to the port, may be first defined in the object definition schema. Then the data in the service request message is mapped into the place holders in the object definition schema. The executable complex object may then be generated from the data-filled object definition schema using a JAVA code generator. To accommodate a new type of service request message, a new object definition schema may be defined using a UI such as a web console, rather than a new module being hard coded.

Block 217 shows building a second service request message by executing the complex JAVA object. In one embodiment, the executable complex JAVA object may be run in a JAVA virtual machine. The output from executing the complex JAVA object is an SMS message to be sent to the mobile device 121. In an embodiment, the complex JAVA object may not be transmitted over the wire or wirelessly. Hence, the JAVA object is translated in some way, for example into XML or into a serialization stream, and then it can be transmitted to the receiver, for example the where the JAVA object may be reassembled, based on the XML or serialization stream, at the receiving end. XML may be preferred in some embodiments, because the class definition of the sending device may not be needed and because the receiver retains a choice on how to build the complex object. The complex JAVA object itself is not sent to the mobile device 121.

Block 219 shows waking up an application on the mobile device 121 by sending the second service request message, or the SMS message, to the mobile device 121. In an embodiment, the SMPP protocol is the choice of the message protocol used to send the SMS message to a port on the mobile device 121 that is specified in the SMS message. The SMPP protocol may direct a message to a specified port on the mobile device 121 while other common choices of message protocols such as the email protocol simple mail transfer protocol (SMTP) may or may not do this. The application manager 126 on the mobile device 121 may listen to the designated port and wakes up the provisioning application 125 associated with the port once the application manager 126 receives the SMS message.

The block 221 shows starting provisioning of the personalized data items into the mobile device 121. Once receiving the second service request message, or the SMS message, the provisioning application 125 on the mobile device 121 may start a dialogue with an application server such as the mobile payment control server 111 to initiate the process of provisioning the personalized data items into the mobile device 121.

FIG. 3 illustrates an embodiment of a system 300 including the SMPP proxy server 310 coupled with the initiating server 161, an SMSC gateway 331, and the mobile device 121. The SMPP proxy server 310 may comprise an application program interface (API) 311, a protocol service module 313, an SMPP interface (IF) 315, an object generator 317, a UI 321, and an XML-based object definition schema 319.

The SMPP proxy server 310 may receive a service request message in an XML-based format, and may turn the message into a SMS message to be sent to the mobile device 121. One common approach of translating a service request message in the XML-based format into an SMS message may be to hardcode the translation logic. To hardcode the translation logic, a software module needs to be coded, compiled, installed in memory, and initialized. This approach may not be efficient when the data items in the service request message have a hierarchical relationship, and when there is a need to accommodate protocols other than the SMPP. In addition, the translation logic becomes more complicated if there is a change to the relationship between the data items. For example, the hierarchical relationship from the MDN of a mobile device to a port on the mobile device, and then to an application associated with the port, as described earlier, may change over time, and when a change occurs, the translation module may need to be recoded.

The SMPP proxy server 310 may have a need to accommodate protocols other than the SMPP, and may generate messages other than the SMS message. For a new protocol, a new translation module may be needed if the translation module is hard coded. The SMPP proxy server 310 uses an approach that defines the protocol data structure in an object schema definition file, then maps the data from a service request message into the object schema, generates a complex JAVA object with a hierarchical object structure to represent the hierarchical relationships between the data items, and then executes the complex objects to generate a second service request message.

The API 311 is configured to respond to a service request message in an XML-based format sent from the initiating server 161. The API 311 may be configured with the knowledge of the HTTP protocol port, message structure, and reply message format. For example, the API 311 may listen on the message port 80 for an HTTP message, parse the message according to the message structure, and send a reply message to the initiating server 161 using the HTTP.

The object definition schema 319 may define a JAVA class hierarchy. For example, a three-level containment hierarchy may have the following information: a subscriber ID at the top of the hierarchy, one or more MDNs that belong to the subscriber and may identify one or more mobile devices at the second level of the containment hierarchy, and a port on the identified mobile device at the bottom level of the containment hierarchy. The JAVA object definition schema may be viewed as place holders that may be filled with values later. The received service request message in the XML-based format may contain the data values for the object schema. To continue the example, the data value contained in the service request may be a subscriber ID "Joe123", and an MDN that belongs to the subscriber ID and identifies the mobile device may be 214.222.1122. The port on the mobile device to which this service request message is sent may be 9811.

The UI 321 may allow a user to edit the XML-based object definition schema 319 to accommodate a change in the service request message. The UI 321 may also allow the user to create a new XML object definition schema for a new service request message using a different protocol.

The object generator 317 may be configured to first parse the object definition schema and the XML data contained in the service request message. In one embodiment, the object generator 317 uses the DOM parser to parse the object definition schema and the SAX parser to parse the XML data. Then the object generator 317 may map the parsed data values into the JAVA class schema, or the place holders. Then the object generator 317 may instantiate the complex JAVA object by creating an executable instance of the complex JAVA object. The object generator 317 may send the instantiated complex JAVA object to the API 311, which in turn may send the generated Java object to the protocol service module 313.

The protocol service module 313 may load the generated complex JAVA objects into memory and execute the objects to generate an SMS message by running the complex object through a JAVA virtual machine. The protocol service module 313 may make use of the interpretive nature of JAVA to execute the generated code without reinitiating the SMPP proxy server itself. Techniques, such as JAVA reflection, may be used that allow the protocol service module 313 to execute a JAVA object without prior knowledge of its existence. The output from executing the complex JAVA objects is an SMS service request message suitable for the SMPP. The protocol service module 313 may then send the SMPP request message to the SMPP interface (IF) 315.

The SMPP IF module 315 may establish a connection with the SMSC gateway 331 to send the SMS request message using the SMPP. The connection attempt may fail and the SMPP IF module 315 may retry within a limit. The number of retries and the interval between retries may be configurable by a user via a UI. The SMPP IF module 315 establishing a connection with the SMSC gateway 331 may also be referred to as binding to the SMSC gateway 331 and the connection retries may be referred to as rebinding. In an embodiment, the SMPP interface module is configured to attempt rebinding to the SMSC gateway 331 if a first binding attempt fails and to repeat the rebinding until the rebinding is successful or a predetermined number of rebindings have been attempted.

The present disclosure may have a number of applications. Example applications may include provisioning a credit card into a mobile device, pushing commercial promotions such as coupons onto the mobile device, or provisioning a temporary ID into the mobile device so that mobile device may double as a temporary ID card for a specified period of time.

Figure 4:
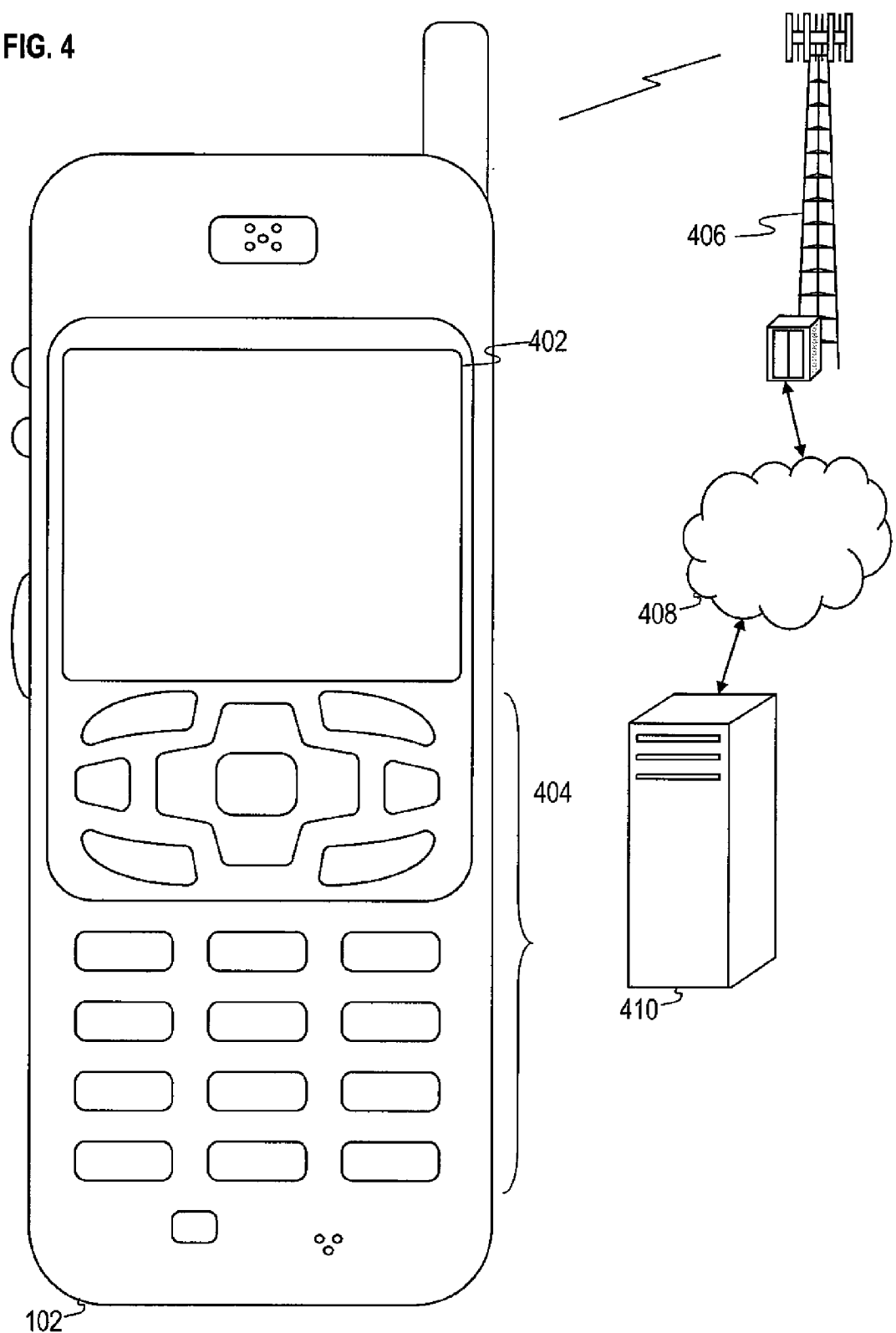
FIG. 4 illustrates an embodiment of a wireless communications system.

FIG. 4 shows a wireless communications system including a handset 102. FIG. 4 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 402 to show a web page. The web page may be obtained via wireless communications with a cell tower 406, a wireless network access node, a peer handset 102 or any other wireless communication network or system. The cell tower 406 (or wireless network access node) is coupled to a wired network 408, such as the Internet. Via the wireless link and the wired network, the handset 102 has access to information on various servers, such as a server 410. The server 410 may provide content that may be shown on the display 402. Alternately, the handset 102 may access the cell tower 406 through a peer handset 102 acting as an intermediary, in a relay type or hop type of connection.

Figure 5:
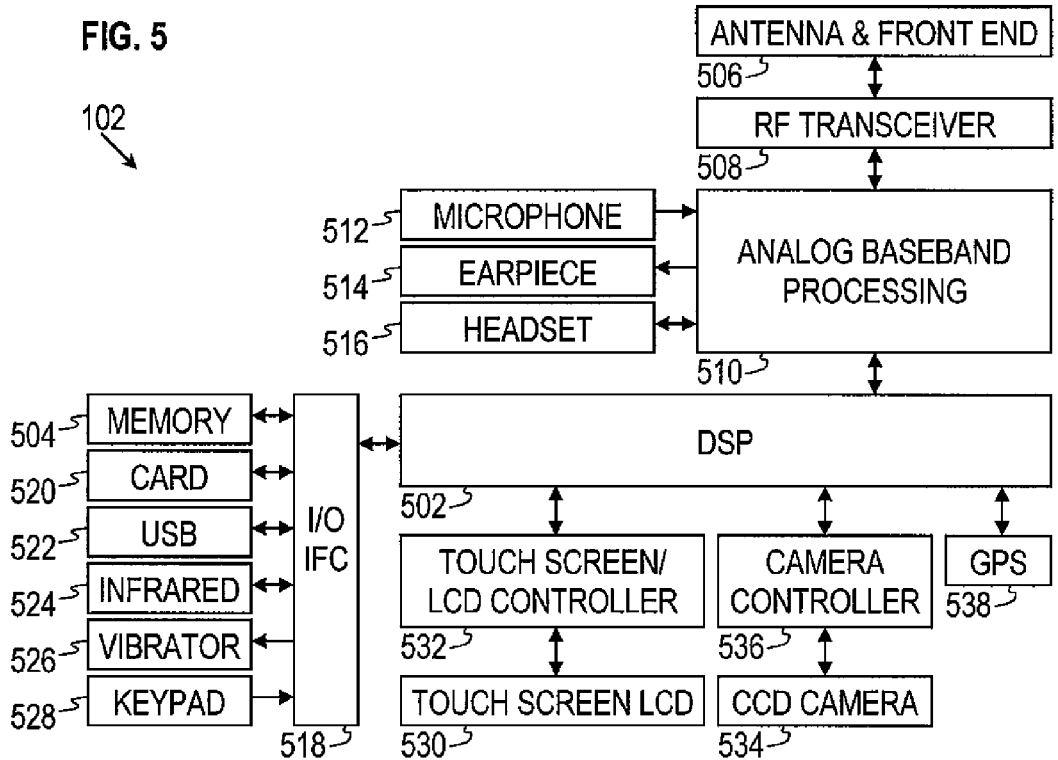
FIG. 5 illustrates an embodiment of a handset in a block diagram.

FIG. 5 shows a block diagram of the handset 102. While a variety of known components of handsets 102 are depicted, in an embodiment a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than Charge Coupled Device cameras may be employed. Various other peripherals may also be included to provide additional functions, e.g., radio and television reception.

Figure 6:
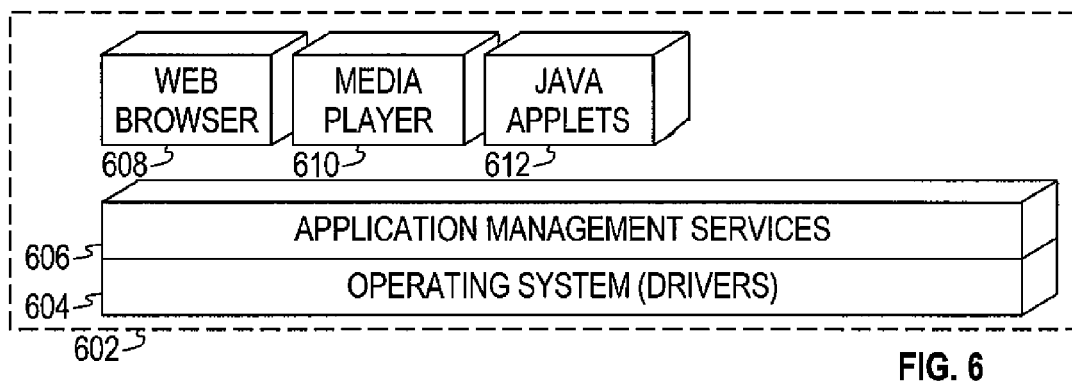
FIG. 6 illustrates an embodiment of a handset software environment.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 6 are a web browser application 608, a media player application 610, and JAVA applets 612. The web browser application 608 configures the handset 102 to operate as a web browser, allowing a user to enter information into forms and select links to retrieve and view web pages. The media player application 610 configures the handset 102 to retrieve and play audio or audiovisual media. The JAVA applets 612 configure the handset 102 to provide games, utilities, and other functionality.

Figure 7:
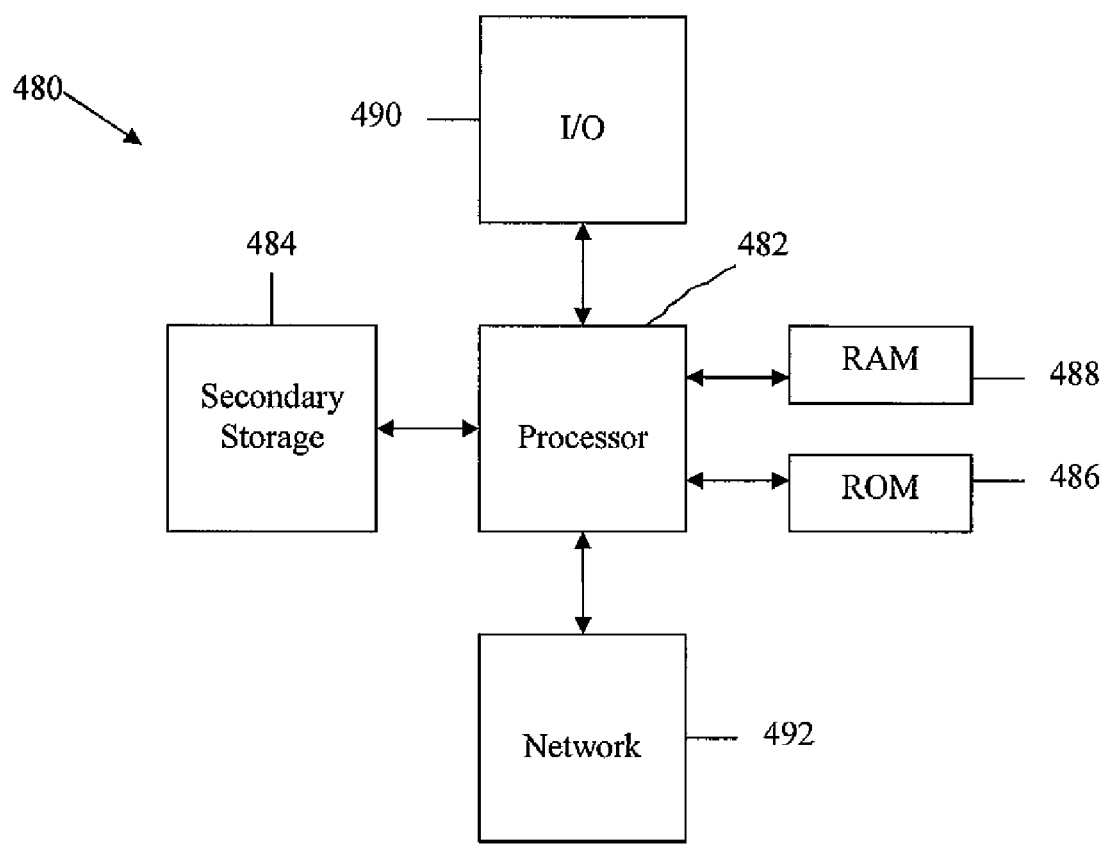
FIG. 7 illustrates an exemplary general-purpose computer system suitable for implementing the several embodiments of the disclosure.

Portions of the network 100 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for provisioning personal data into a mobile device, comprising:
receiving a first service request message at a proxy server;
limiting the first service request message;
converting more than one static data item from the first service request message into one or more executable complex objects by the proxy server by mapping the more than one static data item from the first service request message into corresponding more than one place holders defined in an object definition schema;

producing by the proxy server a second service request message by executing the one or more complex objects; and sending the second service request message by the proxy server to a designated port on a mobile device to wake up a provisioning application on the mobile device to initiate provisioning of a plurality of personalized data item into the mobile device.

2. The method of claim 1, wherein limiting the first service request message further comprises dropping the first service request message if a message count reaches a predefined threshold based on one of an originating source IP address and a source IP address of the first service request message.

3. The method of claim 1, wherein the first service request message and the second service request message include a mobile directory number of the mobile device and the designated port number.

4. The method of claim 1, wherein the more than one data items from the first service request message have a hierarchical relationship.

5. The method of claim 1, wherein the second service request message is a short message service message that is sent using a short message peer-to-peer protocol to the designated port on the mobile device.

6. The method of claim 1, wherein executing the one or more complex objects comprises running the one or more complex objects in a virtual machine.

7. The method of claim 1, wherein the first service request message is an XML-based message communicated via a hypertext transfer protocol message protocol.

8. The method of claim 1, wherein the second service request message is a short message service message.

9. The method of claim 1, wherein the proxy server receives the first service request message from an initiating server.

10. The method of claim 1, wherein the proxy server is a short message peer-to-peer protocol proxy server.

11. The method of claim 1, further comprising:
parsing the first request message by the proxy server using a document object model parser.

12. The method of claim 1, further comprising:
parsing the object definition schema using a simple application program interface for XML parser.

13. The method of claim 1, further comprising:
maintaining the message count by the proxy server based on a mobile directory number of the mobile device.

14. The method of claim 1, wherein the first service request message and the second service request message include a mobile directory number of the mobile device and a port number of the designated port.

15. The method of claim 1, wherein the more than one place holders defined in the object definition schema have a hierarchical relationship.

16. The method of claim 1, further comprising:
editing the object definition schema or creating a new object definition schema through a user interface.

17. The method of claim 1, wherein the second service request message is sent as a short message service message to the designated port on the mobile device by a short message peer-to-peer protocol interface module of the proxy server.

18. The method of claim 17, further comprising:
obtaining routing information from a short message service center to route the short message service second service request message to the mobile device by the short message peer-to-peer protocol interface module.

19. The method of claim 17, further comprising;
attempting to rebind to a short message service center gateway by the short message peer-to-peer protocol interface module if a first binding attempt fails; and
repeating the rebinding until the rebinding is successful or a predefined number of the rebindings has been exhausted.

\* \* \* \* \*